(12) United States Patent
Wu

(10) Patent No.: US 10,779,046 B1
(45) Date of Patent: Sep. 15, 2020

(54) AUTOMATED GENERATION OF VIDEO-BASED ELECTRONIC SOLICITATIONS

(71) Applicant: Coupang, Corp., Seoul (KR)

(72) Inventor: Meng Wu, Seattle, WA (US)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 16/553,354

(22) Filed: Aug. 28, 2019

(51) Int. Cl.
*H04N 21/478* (2011.01)
*H04N 21/4782* (2011.01)
*H04N 21/858* (2011.01)
*H04N 21/81* (2011.01)
*G06Q 30/06* (2012.01)

(52) U.S. Cl.
CPC ... *H04N 21/47815* (2013.01); *G06Q 30/0609* (2013.01); *G06Q 30/0643* (2013.01); *H04N 21/4782* (2013.01); *H04N 21/816* (2013.01); *H04N 21/8153* (2013.01); *H04N 21/8586* (2013.01)

(58) Field of Classification Search
CPC ......... H04N 21/47815; H04N 21/8153; H04N 21/4782; H04N 21/816; H04N 21/8586; G06Q 30/0609; G06Q 30/0643
See application file for complete search history.

(56) References Cited

U.S. PATENT DOCUMENTS

| | | | |
|---|---|---|---|
| 2002/0056136 A1* | 5/2002 | Wistendahl | H04N 7/173 |
| 2012/0167146 A1* | 6/2012 | Incorvia | H04N 5/445 |
| 2015/0245103 A1* | 8/2015 | Conte | H04N 21/812 |

* cited by examiner

*Primary Examiner* — Anthony Bantamoi
(74) *Attorney, Agent, or Firm* — Finnegan. Henderson, Farabow, Garrett & Dunner, LLP

(57) ABSTRACT

Systems and methods are provided for generating a trackable video-based product. One method comprises receiving a video comprising a plurality of frames from a video database; receiving product information associated with at least one product for sale from a product database; and receiving annotation data linking the received product information to at least one of the plurality of frames from a metadata database. The method may further comprise modifying a database to include a link between the at least one of the plurality of frames and the product information and generating an augmented video using the annotation data and the received video. The method may further comprise delivering the augmented video to a client device, such as a user device of a consumer, and responsive thereto receiving a communication related to the delivered video, the communication comprising data relating to an interaction with the video; comparing the data relating to the interaction with the link in the database to determine an associated product; and delivering information associated with the determined associated product to the client device.

16 Claims, 3 Drawing Sheets

AUTOMATED GENERATION OF VIDEO-BASED ELECTRONIC SOLICITATIONS

TECHNICAL FIELD

The present disclosure generally relates to computerized systems and methods for trackable video-based product solicitation. In particular, embodiments of the present disclosure relate to inventive and unconventional systems relate to generating an augmented video containing products for sale to a user, and tracking user actions related to the augmented video to provide more products for sale to a user.

BACKGROUND

Consumers often shop for and purchase various items based on items they have seen while viewing various media (e.g., movies, television shows, advertisements, etc.). As the Internet has become more wide spread, much of this viewing occurs online through computers and smart devices. However, the normal media viewing experience is limited in that a consumer may view movies, shows, and/or advertisements without the option to ever browse for or purchase items that person sees through various media.

For example, a consumer may want to purchase a single item or an entire outfit worn by a character in a show, but that consumer's only avenues for purchasing those items is by searching online or browsing inside a store. These avenues are limited because the consumer may have difficulty finding the desired items or may never find the items. Although some vendors may advertise their items, the shopping process may still be delayed because the consumer still needs to go to the vendor's website or store and search for the desired items, and that process may be difficult and time-consuming.

Therefore, there is a need for improved methods and systems for generating an augmented video containing products for sale to a user, and tracking user actions related to the augmented video to provide more products for sale to a user.

SUMMARY

One aspect of the present disclosure is directed to a system for trackable video-based product solicitation. The system may comprise at least one processor; and at least one non transitory storage medium comprising instructions that, when executed by the at least one processor, cause the at least one processor to perform steps. The steps may comprise receiving a video comprising a plurality of frames; receiving product information associated with at least one product for sale; and receiving annotation data linking the received product information to at least one of the plurality of frames. The steps may further comprise modifying a database to include a link between the at least one of the plurality of frames and the product information and generating an augmented video using the annotation data and the received video. The steps may further comprise delivering the augmented video to a client device, and responsive thereto receiving a communication related to the delivered video, the communication comprising data relating to an interaction with the video; comparing the data relating to the interaction with the link in the database to determine an associated product; and delivering information associated with the determined associated product to the client device.

Another aspect of the present disclosure is directed to a method for generating a trackable video-based product. The method may comprise receiving a video comprising a plurality of frames; receiving product information associated with at least one product for sale; and receiving annotation data linking the received product information to at least one of the plurality of frames. The method may further comprise modifying a database to include a link between the at least one of the plurality of frames and the product information and generating an augmented video using the annotation data and the received video. The method may further comprise delivering the augmented video to a client device, and responsive thereto receiving a communication related to the delivered video, the communication comprising data relating to an interaction with the video; comparing the data relating to the interaction with the link in the database to determine an associated product; and delivering information associated with the determined associated product to the client device.

Yet another aspect of the present disclosure is directed to a system for trackable video-based product solicitation. The system may comprise at least one processor; and at least one non transitory storage medium comprising instructions that, when executed by the at least one processor, cause the at least one processor to perform steps. The steps may comprise receiving a video comprising a plurality of frames; receiving product information associated with at least one product for sale; and receiving annotation data linking the received product information to at least one of the plurality of frames. The steps may further comprise modifying a database to include a link between the at least one of the plurality of frames and the product information; embedding links configured to detect interactions in each frame, wherein the embedded links are configured to analyze a timespan of each interaction; and generating an augmented video using the annotation data and the received video. The steps may further comprise delivering the augmented video to a client device, and responsive thereto receiving a communication related to the delivered video, the communication comprising data relating to the interactions with the video; comparing the data relating to the interaction with the link in the database to determine an associated product; and delivering information associated with the determined associated product to the client device.

Other systems, methods, and computer-readable media are also discussed herein.

DETAILED DESCRIPTION

Figure 1:
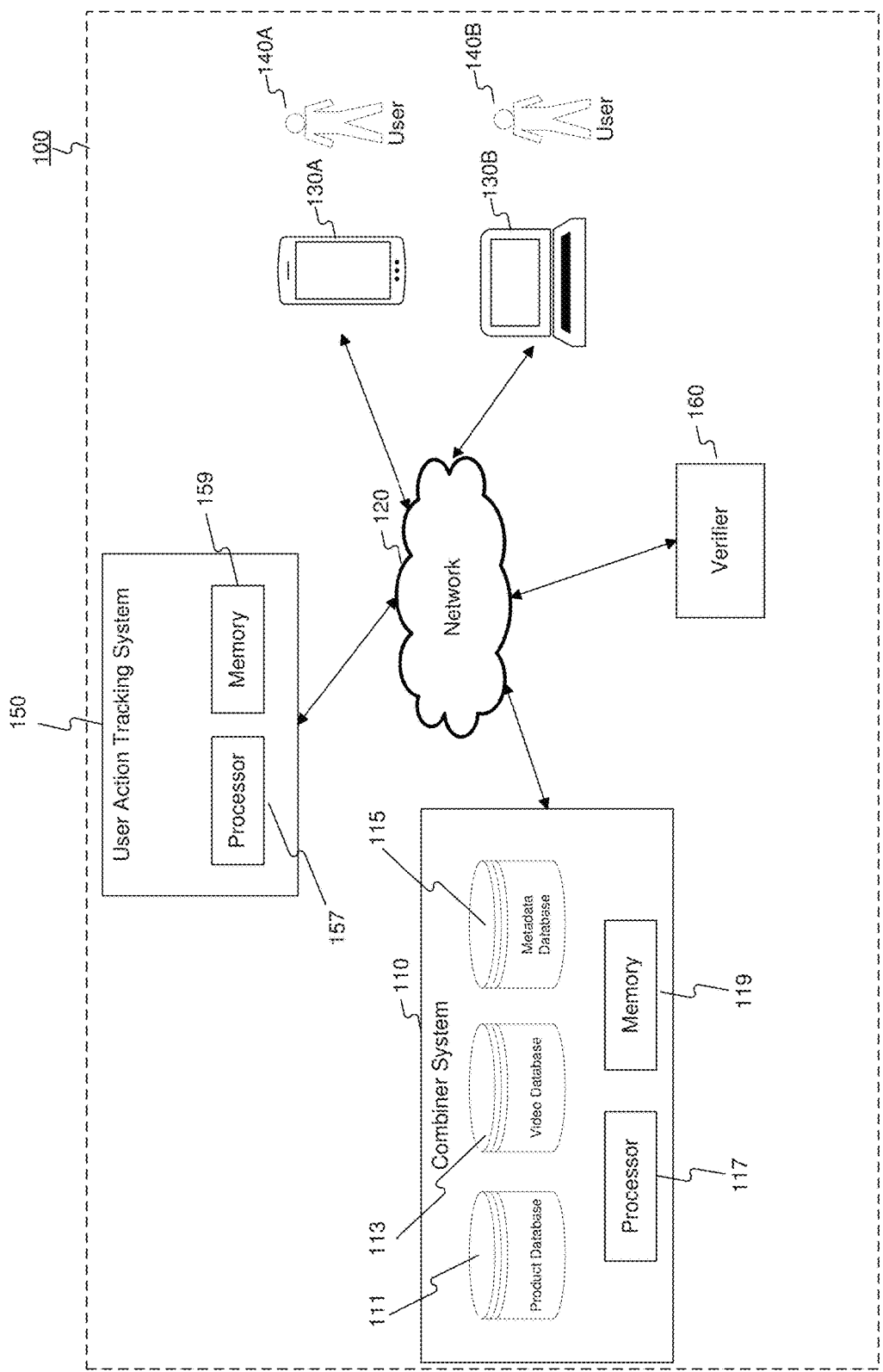
FIG. 1 depicts an exemplary network of devices and systems for generating a trackable augmented video, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for generating a trackable augmented video. The disclosed embodiments are advantageously capable of generating a trackable augmented video using a video, product information, and annotation data. Videos may be constructed or provided by a first user. For example, the first user may create a video from scratch or the first user may provide an already-existing video (e.g., movies, television shows, advertisements, etc.). Product information may be associated with at least one product for sale. For example, product information may include a product identifier, store/vendor identifier, pricing information, shipping information, and/or an image of the product. Annotation data may be metadata that links product information associated with at least one product for sale with the video. For example, metadata may comprise at least one of video frame data, video timestamp data, video object coordinates, or a model appearing in the video.

In one implementation, a first user device of the first user may send a request to generate a trackable augmented video to a server. Upon the request, the server may prompt the first user to submit at least one product for sale to be included in the trackable augmented video. The first user device may send the named product for sale to a combiner system, which retrieves product information associated with the product for sale. The server may either prompt the first user to submit a user-created video, prompt the first user to select an existing video from a video database, or instruct the combiner system to select a video from the video database based on parameters submitted by the first user. For example, the combiner system may select a video from the video database based on the product for sale that the first user wishes to include in the generated trackable augmented video. The combiner system may retrieve metadata from a metadata database and/or the first user may submit user annotation as metadata to the combiner system via an Application Programming Interface (API). The combiner system may tag objects in the retrieved video using the retrieved product information and metadata, and subsequently generate a trackable augmented video. Tagging involves adding associated words to objects in each frame of the retrieved video in the form of keywords, known as "metadata." For example, objects may be tagged with multiple layers relating to the video frame, video timestamp, video object coordinates, or a model appearing in the video. Different sections of each video frame may be tagged according to the location of the objects to be tagged. The tagged data may be stored in the combiner system, e.g., in the metadata database. The combiner system may hash the generated augmented video using an algorithm (e.g., Secure Hash Algorithm standard), then send the hashed augmented video to a verifier, which may uniquely identify the augmented video for authenticity.

In some embodiments, the first user submitting the request to generate the trackable augmented video may be a vendor and the described combiner system may be used commercially for product solicitation. A second user may be a customer of the vendor or a casual shopper. A second user device associated with the second user may send user action data to a user action tracking system while the second user views the generated augmented video. For example, the second user device may send data associated with the second user's cursor hovering over tagged objects in the augmented video and/or data associated with the second user selecting a tagged object (e.g., whether or not the selection resulted in a purchase) to the user action tracking system. The user action tracking system may suggest related items to the second user based on the received user action data.

Referring to FIG. 1, an exemplary network of devices and systems for generating a trackable augmented video is shown. As illustrated in FIG. 1, a system 100 may include a combiner system 110 that may communicate with user devices 130A-130B, a user action tracking system 150, and a verifier 160 via a network 120. In some embodiments, combiner system 110 may communicate with the other components of system 100 via a direct connection, for example, using a cable.

Combiner system 110, in some embodiments, may be implemented as a computer system that generates a trackable augmented video using a video, product information, and annotation data. In other embodiments, combiner system 110 may generate a video and tag each frame with the product information and annotation data as the video is generated. Combiner system 110 may comprise a single computer or may be configured as a distributed computer system including multiple computers that interoperate to perform one or more of the processes and functionalities associated with the disclosed examples. In some embodiments, a first user 140A may, via first user device 130A, send a request to combiner system 110 to generate a trackable augmented video. Upon the request, combiner system 110 may send prompts to first user device 130A for first user 140A to submit at least one product for sale to be included in the generated augmented video. In some other embodiments, first user 140A may, via first user device 130A, generate a video containing objects and submit the generated video to combiner system 110. Combiner system 110 may detect the objects in the generated video and automatically tag the objects with product information and metadata.

As shown in FIG. 1, combiner system 110 may comprise a product database 111, a video database 113, a metadata database 115, a processor 117, and a memory 119. Although databases 111, 113, and 115 are shown as three separate databases, the databases may be a single database. Databases 111, 113, and 115 may include, for example, Oracle™ databases, Sybase™ databases, or other relational databases or non-relational databases, such as Hadoop™ sequence files, HBase™, or Cassandra™. Databases 111, 113, and 115 may include computing components (e.g., database management system, database server, etc.) configured to receive and process requests for data stored in memory devices of the database(s) and to provide data from the database(s). Databases 111, 113, and 115 may include NoSQL databases such as HBase, MongoDB™ or Cassandra™. Alternatively, databases 111, 113, and 115 may include relational databases such as Oracle, MySQL and Microsoft SQL Server. In some embodiments, databases 111, 113, and 115 may take the form of servers, general purpose computers, mainframe computers, or any combination of these components.

Processor 117 may be one or more known processing devices, such as a microprocessor from the Pentium™ family manufactured by Intel™ or the Turion™ family manufactured by AMD™. Processor 117 may constitute a single core or multiple core processor that executes parallel processes simultaneously. For example, processor 117 may use logical processors to simultaneously execute and control multiple processes. Processor 117 may implement virtual machine technologies or other known technologies to provide the ability to execute, control, run, manipulate, store, etc. multiple software processes, applications, programs, etc. In another example, processor 117 may include a multiple-core processor arrangement configured to provide parallel processing functionalities to allow combiner system 110 to execute multiple processes simultaneously. One of ordinary skill in the art would understand that other types of processor arrangements could be implemented that provide for the capabilities disclosed herein.

A memory may store one or more operating systems that perform known operating system functions when executed by processor 117. By way of example, the operating system may include Microsoft Windows, Unix, Linux, Android, Mac OS, iOS, or other types of operating systems. Accordingly, examples of the disclosed invention may operate and function with computer systems running any type of operating system. Memory may be a volatile or non-volatile, magnetic, semiconductor, tape, optical, removable, non-removable, or other type of storage device or tangible computer readable medium.

Databases 111, 113, and 115 may store data that may be used by processor 117 for performing methods and processes associated with disclosed examples. Databases 111, 113, and 115 may be located in combiner system 110 as shown in FIG. 1, or alternatively, it may be in an external storage device located outside of combiner system 110. Data stored in product database 111 may include any suitable product information data associated with at least one product for sale. For example, product information data stored in product database 111 may include product identifiers, store/vendor identifiers, pricing information, shipping information, and/or images of the product. Data stored in video database 113 may include movies, television shows, and/or advertisements that further include animated assets, video scripts, computer-generated image models, and/or character models. Data stored in metadata database 115 may include video frame data, which may include timestamp data for each frame, object coordinates for each frame, and/or at least one model appearing in at least one frame.

User devices 130A-130B may be a tablet, mobile device, computer, or the like. User devices 130A-130B may include a display. The display may include, for example, liquid crystal displays (LCD), light emitting diode screens (LED), organic light emitting diode screens (OLED), a touch screen, and other known display devices. The display may show various information to a user. For example, it may display the augmented video provided by combiner system 110. User devices 130A-130B may include one or more input/output (I/O) devices. The I/O devices may include one or more devices that allow user devices 130A-130B to send and receive information from user 140A-140B or another device. The I/O devices may include various input/output devices, a camera, a microphone, a keyboard, a mouse-type device, a gesture sensor, an action sensor, a physical button, an oratory input, etc. For example, a user may use a mouse-type device of a user device to move a cursor over various objects in an augmented video. The I/O devices may also include one or more communication modules (not shown) for sending and receiving information from combiner system 110 by, for example, establishing wired or wireless connectivity between user devices 130A-130B and network 120.

After first user 140A, via first user device 130A, submits at least one product for sale to combiner system 110, combiner system 110 retrieves product information associated with the product for sale from product database 111. Combiner system 110 may send prompts to first user device 130A for first user 140A to submit a video created by first user 140A or to select an existing video from video database 113. Combiner system 110 may retrieve a video from video database 113 based on the first user's selection. Alternatively, combiner system 110 may retrieve a video from video database 113 based on the at least one product for sale submitted by first user 140A. For example, if first user 140A submits a brand name wristwatch to combiner system 110, then combiner system 110 may retrieve a video containing that wristwatch from video database 113. Combiner system 110 may retrieve metadata from metadata database 115 based on the retrieved product information and video and/or send prompts to first user device 130A for first user 140A to submit user annotation as metadata via an API. For example, first user 140A may submit a uniform resource identifier (URI) to combiner system 110, from which combiner system 110 can retrieve metadata.

Using the retrieved product information and the retrieved metadata, combiner system 110 links the product information to the retrieved video to generate a trackable augmented video. For example, combiner system 110 may retrieve/receive metadata for a brand name wristwatch that includes the frames (e.g., frames 76-167) in which the wristwatch appears in the retrieved video, the timestamps (e.g., 01:30-09:30) during which the wristwatch appears in the retrieved video, the coordinates (e.g., x, y) at which the wristwatch appears in each frame of the retrieved video, and/or a model (e.g., animated model or sprite) of a wristwatch appearing in the retrieved video. Combiner system 110 may superimpose the at least one image of the product for sale on an animated asset of the retrieved video to produce a combined asset for at least one frame of a generated augmented video. Combiner system 110 may further associate the retrieved metadata and the retrieved product information with the combined asset in the augmented video. Combiner system 110 may perform these steps for a plurality of product in a single video or for a plurality of videos. The associated metadata and combined asset may be stored in metadata database 115.

The product information retrieved from product database 111 may further include a link to a web page for accessing additional product information (e.g., product cost, dimensions, ratings, images of product, option to purchase product, etc.) over network 120. The web page may include, for example, images of the product, shelf life, country of origin, weight, size, number of items in package, handling instructions, ratings, or other information about the product. The web page may also include, for example, pries for each product, information relating to enhanced delivery options for each product, promised delivery date (PDD), offers, discounts, or the like. The information could also include recommendations for similar products (based on, for example, big data and/or machine learning analysis of customers who bought this product and at least one other product), answers to frequently asked questions, reviews from customers, manufacturer information, pictures, or the like.

The web page may also include other interactive elements such as a "Buy Now" button, a "Add to Cart" button, a quantity field, a picture of the item, or the like. The web page may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD.

Combiner system 110 may embed the link in the combined asset of the augmented video. Combiner system 110 may encrypt the generated augmented video such that a user must submit credentials to verifier 160 to confirm authenticity of the user when submitting a request to view an augmented video. Combiner system 110 may also hash the generated augmented video so that when second user 140B requests to view the augmented video via a second user device 130B, combiner system 110 sends the requested hashed augmented video to verifier 160, which may uniquely identify the hashed augmented video and the user's request for authenticity. For example, combiner system 110 may produce a hash (digital) fingerprint on each frame of the augmented video. When second user 140B requests to view the augmented video, combiner system 110 may send the requested hashed augmented video and the request to verifier 160. Verifier 160 may then employ a hash function that may uniquely identify the augmented video and verify that the augmented video has not been corrupted. Verifier 160 may further determine authenticity of the request by verifying the accuracy of the submitted credentials. Upon verification of the augmented video and the request, verifier 160 may notify combiner system 110 of the requested augmented video and user's authenticity and combiner system 110 may deliver the trackable augmented video to second user device 130B so that second user 140A may view the video.

Additionally, combiner system 110 may embed links throughout the image of each frame, where the links are configured to detect various second user 140B interactions with the augmented video via second user device 130B.

As shown in FIG. 1, user action tracking system 150 may comprise a processor 157 and a memory 159. Processor 157 may be one or more known processing devices, similar to processor 117 described above. Processor 157 may constitute a single core or multiple core processor that executes parallel processes simultaneously. For example, processor 157 may use logical processors to simultaneously execute and control multiple processes. Processor 157 may implement virtual machine technologies or other known technologies to provide the ability to execute, control, run, manipulate, store, etc. multiple software processes, applications, programs, etc. In another example, processor 157 may include a multiple-core processor arrangement configured to provide parallel processing functionalities to allow user action tracking system 150 to execute multiple processes simultaneously. One of ordinary skill in the art would understand that other types of processor arrangements could be implemented that provide for the capabilities disclosed herein. Memory 159 may be one or more known memory devices, similar to memory 159 described above.

Although not shown in FIG. 1, user action tracking system 150 may include a database. As previously described for databases 111, 113, and 115, a database may store data that may be used by processor 157 for performing methods and processes associated with disclosed examples. A database may be located in user action tracking system 150 as shown in FIG. 1, or alternatively, it may be in an external storage device located outside of user action tracking system 150. Data stored in a database of user action tracking system 150 may include any suitable user action data associated with second user 140B while second user 140B views the generated augmented video on second user device 130B.

User action tracking system 150 can receive communications through network 120 related to the delivered augmented video. Communications can include data related to second user 140B's interactions (e.g., cursor hovering, cursor clicking, tapping, dragging, mouse-over, etc.), via second user device 130B, with the augmented video. For example, when second user 140B holds a cursor of second user device 130B over a combined asset containing an embedded link, a visual icon (e.g., text bubble, image bubble, etc.) may appear. The visual icon may display product information associated with the combined asset, such as product cost, dimensions, ratings, images, options to purchase the product, etc. If second user 140B selects the combined asset (e.g., by clicking over the asset), then the embedded link provides the web page containing additional product information associated with the combined asset. Communications may also include various interactions of second user 140B with the augmented video via second user device 130B. For example, the embedded links configured to detect the interactions may analyze the timespan of each cursor hover associated with various combined assets. That is, the embedded links may be configured to measure and compare second user 140B's cursor hover timespan for each combined asset.

The embedded links may also be configured to detect interactions with the augmented video such as: the frames of the augmented video viewed/played by the user, the time span of the user's views of the video, the time span and number of pauses the user employed, which frames and associated objects the user replayed, the number of replays, which areas of each frame the user hovered over, the time span of each hover, the other objects in each frame with which the user interacted, the point at which the user closed out of a visual icon associated with an object, whether a visual icon contained accurate information for the object, which frames the user skipped, the total time span of the user's interaction with or view of a video, the points at which the user closed the video or switched away from the video, the number of times the user forwarded a video or product link from the video to other users, or the like.

User action tracking system 150 may determine a customer identifier associated with the communications (e.g., interactions), send a request to authenticate to verifier 160, and receive confirmation of authentication from verifier 160. User action tracking system 150 may send a "requested" interaction (e.g., an attempt to hover over or select an object) to verifier 160, which may uniquely identify the hashed augmented video (e.g., the targeted web pages associated with the product information and metadata) and the user's request for authenticity. Verifier 160 may employ a hash function that may uniquely identify the hashed product information and metadata and verify that the hashed data has not been corrupted. Upon verification of the requested interaction, verifier 160 may notify user action tracking system 150 of the authenticity of the requested interaction. After receiving confirmation from verifier 160, user action tracking system 150 may compare the data related to the communications to metadata database 115 over network 120 to determine the associated product of the combined asset. Using this comparison, user action tracking system 150 may deliver information associated with the determined associated product to user client device 130B (e.g., new product suggestions, related products, product cost, product dimensions, product ratings, product images, options to purchase product, etc.). User action tracking system 150 may determine whether second user 140B's interactions resulted in a purchase of the associated product, store the purchase determination in a database of user action tracking system 150 associated with second user 140B, and suggest new videos and/or products to second user 140B based on the determination. Based on a user's (e.g., customer, video producer, etc.) various interactions with one or more augmented videos, user action tracking system 150 may generate a profile for the user. The profile may include videos most frequently viewed by the user, products most frequently viewed by the user, categories (e.g., clothing, furniture, electronic media, etc.) most frequently interacted with by the user, etc. User action tracking system 150 may recommend additional videos and products to the user based on the user's profile.

When the web page is provided to second user 140B via second user device 130B, second user 140B may click or otherwise interact with a "Place in Cart" button on the web page. This adds the product to a shopping cart associated with the user. Second user device 130B may transmit this request to add the product to the shopping cart to network 120.

In some embodiments, an external system (not pictured) may be implemented as a computer system that enables external users to interact with one or more systems in system 100. For example, in embodiments where system 100 enables the presentation of systems to enable users to place an order for an item, external system may be implemented as a web server that receives search requests, presents item pages, and solicits payment information. For example, the external system may be implemented as a computer or computers running software such as the Apache HTTP Server, Microsoft Internet Information Services (IIS), NGINX, or the like. In other embodiments, the external system may run custom web server software designed to receive and process requests from external devices, acquire information from databases and other data stores based on those requests, and provide responses to the received requests based on acquired information.

In some embodiments, external system may include one or more of a web caching system, a database, a search system, or a payment system. In one aspect, external system may comprise one or more of these systems, while in another aspect, external system may comprise interfaces (e.g., server-to-server, database-to-database, or other network connections) connected to one or more of these systems.

External system may receive information from systems or devices in system 100 for presentation and/or display. For example, external system may host or provide one or more web pages, including a Search Result Page (SRP), a Single Detail Page (SDP), a Cart page, or an Order page.

The external system may generate a Cart page. The Cart page, in some embodiments, lists the products that the user has added to a virtual "shopping cart." Second user 140B may request the Cart page by clicking on or otherwise interacting with an icon on the web page or other pages. The Cart page may, in some embodiments, list all products that second user 140B has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. Second user 140B at second user device 130B may click on or otherwise interact with a user interface element (e.g., a button that reads "Buy Now") to initiate the purchase of the product in the shopping cart. Upon doing so, second user device 130B may transmit this request to initiate the purchase to network 120.

The external system may generate an Order page in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. The external system may send the Order page to second user device 130B.

Second user 140B may enter information on the Order page and click or otherwise interact with a user interface element that sends the information to the external system. From there, the external system may send the information to different systems in system 100 to enable the creation and processing of a new order with the products in the shopping cart.

Figure 2:
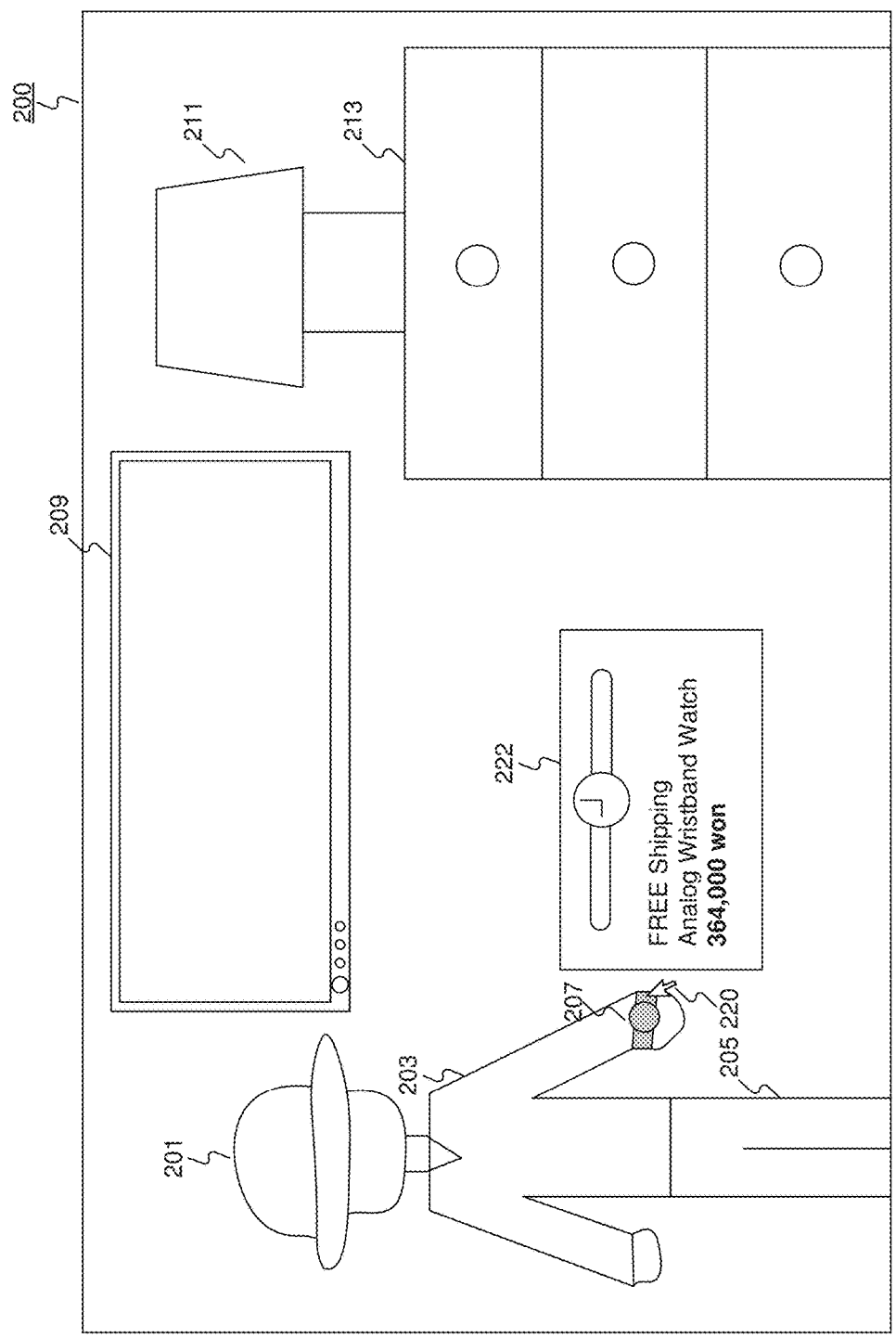
FIG. 2 depicts a frame of a trackable augmented video, consistent with the disclosed embodiments.

FIG. 2 depicts a frame of a trackable augmented video, consistent with the disclosed embodiments. A user device display 200 may show a frame of an augmented video for second user 140B, as explained above. The frame may contain various combined assets created by combined system 110, such as a hat 201, a shirt 203, pants 205, a wristwatch 207, a television 209, a lamp 211, and a dresser 213. Second user 140B may use cursor 220 to hover over wristwatch 207. Visual icon 222 may appear as a result of the cursor hover. As explained above, visual icon 222 may display product information associated with wristwatch 207, such as an image of the product, shipping information, product identifier, and cost.

Figure 3:
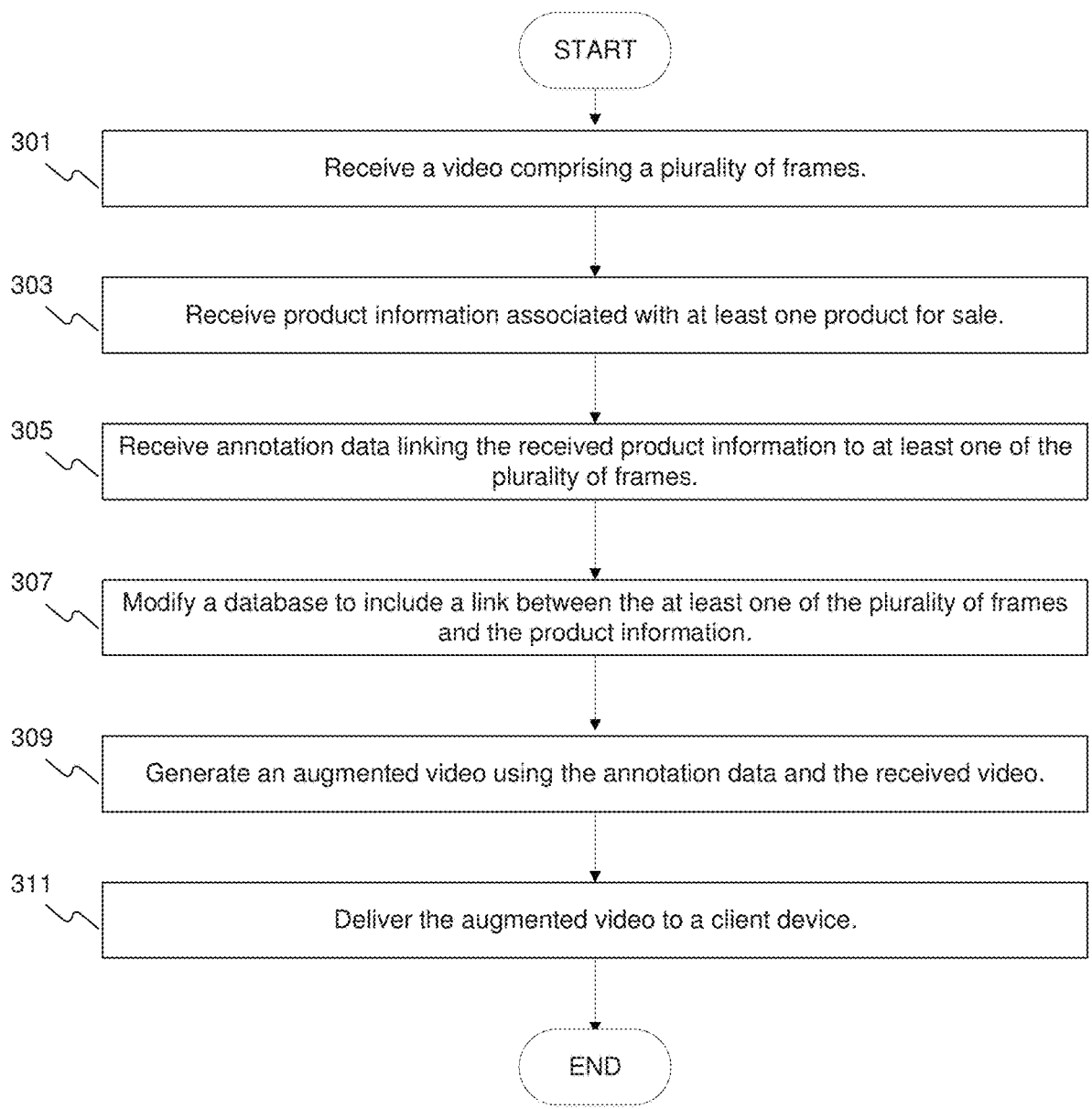
FIG. 3 depicts a process for generating a trackable augmented video, consistent with the disclosed embodiments.

FIG. 3 depicts a process for generating a trackable augmented video, consistent with the disclosed embodiments.

In step 301, combiner system 110 receives a video comprising a plurality of frames from video database 113. In some embodiment, combiner system 110 receives a video from first user 140A via first user device 130A. In other embodiments, the video is created by first user 140A. In some other embodiments, combiner system 110 may retrieve a video from video database 113 based on at least one product for sale submitted by first user 140A. The video may include movies, television shows, and/or advertisements that further include animated assets, video scripts, computer-generated image models, and/or character models.

In step 303, combiner system 110 receives product information associated with at least one product for sale from product database 111. Product information may include a product identifier, store/vendor identifier, pricing information, shipping information, and/or an image of the product for sale.

In step 305, combiner system 110 receives annotation data linking the received product information to at least one of the plurality of frames. Annotation data may be metadata. For example, metadata may comprise at least one of video frame data, video timestamp data, video object coordinates, or a model appearing in the video. Combiner system 110 may receive annotation data from metadata database 115. In some embodiments, first user 140A may submit annotation data via first user device 130A using an API (e.g., first user 140A may submit a URI to combiner system 110 via first user device 130A).

In step 307, combiner system 110 may modify a database (e.g., metadata database 115) to include a link between at least one of the plurality of frames and the product information. For example, the metadata associated with a combined asset may be stored in metadata database 115.

In step 309, combiner system 110 may generate an augmented video (i.e., a video with product information and metadata embedded in each frame) using the annotation data and the received video. Combiner system 110 may generate the augmented video by tagging objected in the received video using the received product information and metadata.

In step 311, combiner system 110 may deliver the augmented video to a client device (e.g., second user device 1308) over network 120. Second user device 1308 may send user action data to user action tracking system 150 while second user 1408 views the augmented video. User action tracking system 150 may analyze the data relating to the interaction and deliver information to second user device 1308 based on the analysis.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system for trackable video-based product solicitation, comprising:
at least one processor; and
at least one non-transitory storage medium comprising instructions that, when executed by the at least one processor, cause the at least one processor to perform steps comprising:
receiving a video comprising a plurality of frames;
receiving product information associated with at least one product for sale, wherein the product information comprises at least one image;
receiving annotation data linking the received product information to at least one of the plurality of frames;
modifying a database to include a link between the at least one of the plurality of frames and the product information, wherein the product information comprises at least one vendor identifier that is associated with a vendor of the at least one product for sale;
generating an augmented video using the annotation data, the received video, a database of animated assets, the product information, and a video script, wherein generating the augmented video further comprises:
superimposing the at least one image on an asset from the database of animated assets to produce a combined asset;
generating the video using the combined asset;
for a plurality of the frames of the generated video, associating coordinates of the combined asset with the annotation data; and
including in the database, in association with the product information, the coordinates associated with the combined asset;
delivering the augmented video to a client device, and responsive thereto:
receiving a communication related to the delivered video, the communication comprising data relating to an interaction with the video;
comparing the data relating to the interaction with the link in the database to determine an associated product; and
delivering information associated with the determined associated product to the client device.

2. The system of claim 1, wherein the database of animated assets comprises at least one of animations, computer-generated image models, or character models.

3. The system of claim 1, wherein the annotation data is associated with a product for sale, and comprises at least one of:
frame data;
coordinates; or
a model appearing in the video.

4. The system of claim 3, wherein the steps further comprise:
receiving, as annotation data, information associated with the model appearing in the video;
associating, in the database, product information for a plurality of products with the model.

5. The system of claim 1, wherein the steps further comprise:
determining a customer identifier associated with the interaction;
determining whether the interaction resulted in a purchase;
storing the purchase determination in a database in association with the customer identifier.

6. The system of claim 1, wherein the augmented video comprises an association between the product information, the annotation data, and a link to a web page for accessing additional product information.

7. The system of claim 1 wherein the augmented video is hashed such that it may be uniquely identified for authenticity.

8. The system of claim 1, wherein the interaction comprises one of a click, a tap, a drag, or a mouse-over.

9. A method for generating a trackable video-based product, comprising:
- receiving a video comprising a plurality of frames;
- receiving product information associated with at least one product for sale, wherein the product information comprises at least one image;
- receiving annotation data linking the received product information to at least one of the plurality of frames;
- modifying a database to include a link between the at least one of the plurality of frames and the product information, wherein the product information comprises at least one vendor identifier that is associated with a vendor of the at least one product for sale;
- generating an augmented video using the annotation data, the received video, a database of animated assets, the product information, and a video script, wherein generating the augmented video further comprises:
  - superimposing the at least one image on an asset from the database of animated assets to produce a combined asset;
  - generating the video using the combined asset;
  - for a plurality of the frames of the generated video, associating coordinates of the combined asset with the annotation data; and
  - including in the database, in association with the product information, the coordinates associated with the combined asset;
- delivering the augmented video to a client device, and responsive thereto:
  - receiving a communication related to the delivered video, the communication comprising data relating to an interaction with the video;
  - comparing the data relating to the interaction with the link in the database to determine an associated product; and
  - delivering information associated with the determined associated product to the client device.

10. The method of claim 9, wherein the database of animated assets comprises at least one of animations, computer-generated image models, or character models.

11. The method of claim 9, wherein the annotation data is associated with a product for sale, and comprises at least one of:
- frame data;
- coordinates; or
- a model appearing in the video.

12. The method of claim 11, further comprising:
- receiving, as annotation data, information associated with the model appearing in the video;
- associating, in the database, product information for a plurality of products with the model.

13. The method of claim 9, further comprising:
- determining a customer identifier associated with the interaction;
- determining whether the interaction resulted in a purchase;
- storing the purchase determination in a database in association with the customer identifier.

14. The method of claim 9, wherein the augmented video comprises an association between the product information, the annotation data, and a link to a web page for accessing additional product information.

15. The method of claim 9, wherein the interaction comprises one of a click, a tap, a drag, or a mouse-over.

16. A system for trackable video-based product solicitation, comprising:
- at least one processor; and
- at least one non-transitory storage medium comprising instructions that, when executed by the at least one processor, cause the at least one processor to perform steps comprising:
  - receiving a video comprising a plurality of frames;
  - receiving product information associated with at least one product for sale, wherein the product information comprises at least one image;
  - receiving annotation data linking the received product information to at least one of the plurality of frames;
  - modifying a database to include a link between the at least one of the plurality of frames and the product information, wherein the product information comprises at least one vendor identifier that is associated with a vendor of the at least one product for sale;
  - embedding links configured to detect interactions in each frame, wherein the embedded links are configured to analyze a timespan of each interaction;
  - generating an augmented video using the annotation data, the received video, a database of animated assets, the product information, and a video script, wherein generating the augmented video further comprises:
    - superimposing the at least one image on an asset from the database of animated assets to produce a combined asset;
    - generating the video using the combined asset;
    - for a plurality of the frames of the generated video, associating coordinates of the combined asset with the annotation data; and
    - including in the database, in association with the product information, the coordinates associated with the combined asset;
  - delivering the augmented video to a client device, and responsive thereto:
    - receiving a communication related to the delivered video, the communication comprising data relating to the interactions with the video;
    - comparing the data relating to the interaction with the link in the database to determine an associated product; and
    - delivering information associated with the determined associated product to the client device.

* * * * *